United States Patent [19]

Flaxman

[11] Patent Number: 5,452,859
[45] Date of Patent: Sep. 26, 1995

[54] VEHICLE WASHING APPARATUS

[76] Inventor: Michael M. Flaxman, 200 Sterling Rd., Harrison, N.Y. 10528

[21] Appl. No.: 185,704

[22] Filed: Jan. 21, 1994

[51] Int. Cl.$^6$ .................................................. B60S 3/04
[52] U.S. Cl. .......................... 239/751; 134/123; 239/752
[58] Field of Search .................... 134/45, 58 R, 134/99.2, 123, 172; 239/750, 751, 752, 753, 273, 282

[56] References Cited

U.S. PATENT DOCUMENTS

| | | | |
|---|---|---|---|
| 2,583,703 | 1/1952 | Morison | 15/97 |
| 2,689,577 | 9/1954 | Dunn | 134/123 |
| 2,703,579 | 3/1955 | Merancy et al. | 134/123 X |
| 2,854,680 | 10/1958 | Wilson | 134/123 X |
| 3,088,472 | 5/1963 | Haines | 134/57 |
| 3,102,545 | 9/1963 | Knight | 134/45 |
| 3,258,019 | 6/1966 | Bellas | 134/99 |
| 3,339,563 | 9/1967 | Ordonez | 134/123 X |
| 3,351,076 | 11/1967 | Haines | 134/58 |
| 3,451,094 | 6/1969 | Espanda Kywi | 134/123 X |
| 3,612,075 | 10/1971 | Cook | 134/99 |
| 3,703,880 | 11/1972 | Wampler | 239/753 X |
| 3,844,480 | 10/1974 | Taylor et al. | 239/752 |
| 4,303,087 | 12/1981 | Flaxman | 134/58 |
| 4,719,932 | 1/1988 | Burton | 134/172 X |
| 4,726,388 | 2/1988 | Swinehart et al. | 134/123 X |
| 4,750,504 | 6/1988 | Flaxman | 134/123 |
| 4,988,042 | 1/1991 | Del Prato et al. | 134/172 X |
| 5,016,662 | 5/1991 | Crotts et al. | 134/123 X |

FOREIGN PATENT DOCUMENTS 2653399 4/1991 France .................................... 134/45

Primary Examiner—Philip R. Coe
Attorney, Agent, or Firm—Ladas & Parry

[57] ABSTRACT

A vehicle washing apparatus is provided which includes an inverted U-shaped structure consisting of two vertical beams connected by a header beam and including a horizontal beam extending between the vertical beams. The vertical and horizontal beams are provided with internal passageways or hoses for the transmission of a washing fluid which is projected out of the beams by ways of nozzles. The nozzles in the vertical beams are such that water is projected from one beam towards the other beam and an arrangement of nozzles is provided in the horizontal beam so that the washing fluid can be projected in opposite horizontal directions therefrom as well as downwardly. Tracks are provided along which the U-shaped structure is displaced for projecting washing fluid along the longitudinal extent of the vehicle. A control is provided whereby the horizontal beam can be displaced upwardly and downwardly according to the vertical beams so that the horizontal beam can be located relative to the profile of the vehicle as the vertical beams are displaced therealong. A control box including a computer is provided to operate as a control by means of which a washing liquid such as water can be mixed with a detergent or the like. There are also controls for displacing the vertical and horizontal beams. A series of connected links are provided by means of which fluid can be conveyed to the horizontal beam taking into account the vertical displacement of the same.

5 Claims, 5 Drawing Sheets

5,452,859

VEHICLE WASHING APPARATUS

FIELD OF THE INVENTION

This invention relates to apparatus and methods for the washing of vehicles or the like and more particularly to controllable arrangements for projecting a washing fluid against a vehicle for the cleaning of the same and to methods related thereto.

BACKGROUND

In my earlier U.S. Pat. No. 4,750,504 issued Jun. 14, 1988 I have disclosed a vehicle washing apparatus in which two U-shaped frames suspend a rectangular frame in an overhead arrangement. In the rectangular frame is supported a control for playing out four line which are guided by pulleys to a vertical attitude suspending an open frame adapted for being lowered and raised. In lowered position, the frame encircles the vehicle and sprays the same with water and a cleaning fluid. For this purpose, the frame is provided with an inwardly directed set of nozzles. The water detergent are stored in two tanks connected to pumps which drive the water and detergent through associated nozzles as mentioned above.

Other vehicle washing devices are disclosed in U.S. Pat. No. 2,583,703; 2,689,577; 3,088,472; 3,102,545; 3,258,019; 3,351,076; 3,612,075 and 4,303,087.

SUMMARY OF INVENTION

It is an object of the invention to provide a novel and improved design for a vehicle washing apparatus which results in a great economy of installation and building materials.

It is another object of the invention to provide an improved washing apparatus which is readily installed and which requires relatively small space for the accommodation thereof.

It is yet another object of the invention to provide an improved apparatus which achieves its object without the sacrifice of cleaning effectiveness and efficiency.

Yet another object of the invention is to provide an improved vehicle washing apparatus which adjusts for the best non-touching washing operation with a most efficient use of chemicals, water and utilities.

Still another object of the invention is to provide for built-in safety features which protect the operator and customers for the services rendered thereby.

Still another object of the invention is to provide for computer versatility which allows for individually tailored programs or for manual operation.

Yet another object is to provide for factory-direct installation.

Still another object is to provide for a vehicle washing apparatus of the indicated type which permits in excess of 30 to 35 cars to be washed per day.

Still another object of the invention is to provide a design for a vehicle washing apparatus which can allow for one or more bays to be employed for the parallel washing of multiple vehicles.

In achieving the above and other objects of the invention, there is provided a vehicle washing apparatus which includes two at least generally vertical beams, and at least generally horizontal beams extending between the vertical beams with said beams having internal passages for the flow of fluid therethrough. A spray arrangement is provided in the vertical and horizontal beams. With respect to the vertical beams the nozzles which constitute the spray arrangement are such that fluid is sprayed from each vertical beam towards the other vertical beam thereby being directed against the sides of the vehicle being washed. With respect to the horizontal beams, the nozzles constituting the spray arrangement are such that fluid can be sprayed in opposite horizontal directions as well as generally downwards. A control arrangement is provided to raise and lower the horizontal beam between the vertical beams and a supply arrangement is provided to supply fluid to the internal passages of the beams as mentioned above.

In accordance with a feature of the invention, the beams generally define a plane and a control is provided to displace the beams as a unit in directions generally perpendicular to this plane. The above-mentioned control will include a piston cylinder arrangement or the like and a cable arrangement coupled between the piston and cylinder arrangement and the horizontal beam to raise and lower the latter relative to the vertical beams.

According to another feature, the supply arrangement includes pivotally connected links extending to said horizontal beam and a tube extending through the links and connected to the passageway in the horizontal beam to delivery fluid to the same.

Yet another feature of the invention relates to the provision of a counter balancing arrangement connected to the horizontal beam to counter balance the weight thereof.

Still another feature of the invention relates to the fact that the beams are constructed of a metal such as, preferably, aluminum which is provided with a fiberglass outer surface to prevent damage to the vehicle being washed as well as to operators of the same.

Another feature of the invention relates to the provision of a supply component which supplies a detergent to the aforementioned fluid and a computer to control the relative amounts of fluid and detergent supplied.

Yet another feature relates to the provision of tracks aligned generally perpendicular to the aforementioned plane with the vertical beams being engaged with the tracks and with a motor being provided to rotate cogs to displace the vertical beams along the tracks in suspended relationship.

Another feature relates to the provision of a header beam coupling the vertical beams at the tops thereof to constitute an inverted U-shaped structure.

Still another feature relates to the fact that the aforesaid links include respective part-circular units in nesting relationship to join the links pivotally together and to the aforementioned horizontal beam.

Another feature of the invention relates to the provision of serially connected U-shaped sections of hose connected to the passageways in the vertical beams and adapted to play out to accommodate displacement of the vertical beams.

Another object of the invention is to provide for the tracks to support the vertical beams in suspended relationship to a supporting surface such as a floor.

Yet other features relate to the provision of guide tracks for the beams and rollers on the beams and accommodated on the guide tracks to guard the movement of the beams without undesirable lateral displacement.

In the description which follows below, it will be seen that the horizontal beam includes top and bottom sections and opposite sides sections between the top and bottom sections with nozzles being provided on the opposite side and bottom sections for appropriate projection of the cleaning fluid.

Another feature of the invention relates to the provision of means to support the tracks in fixed parallel relationship so that appropriate guidance is provided for displacement of the vertical beams.

Yet another feature is the provision of a support for the vertical beams to be in spaced relationship with respect to the surface upon which is supported the vehicle being cleaned.

It is yet another object of the invention to provide an improved method of washing vehicles.

In accordance with this feature of the invention, there are comprised the steps of positioning the vehicle between space vertical beams as mentioned above, which beams are adapted to straddle the vehicle. Provision is made for displacing the vertical beams along the vehicle while projecting washing fluid out of the vertical beams towards the vehicle. Another step involves supporting a horizontal beam between the vertical beams and displacing the horizontal beam on the vertical beams according to the profile of the vehicle. Included in this method is the selective projecting of washing fluid out of the horizontal beam at the vehicle according to the profile of the same.

A feature of the method of the invention is the projection of washing fluid out of the horizontal beam selectively in downward or opposite horizontal directions. This may be manually controlled or programmed to the computer.

Other objects, features and advantages of the invention will be found in the following detailed description as illustrated in the accompanying drawing.

DETAILED DESCRIPTION

The purpose of the vehicle washing apparatus of the invention is to provide for the projection of washing fluid including water and a detergent or the like against the outer surface of a vehicle in such strength and in such chemical composition as to provide for the removal of grime and such forms of dirt as generally accumulate upon vehicles in use. As noted above, it is an accomplishment of the invention to provide an apparatus which is relatively inexpensive and which is capable of being easily installed at minimum use of installation services and the like. It will be appreciated from the detailed description which follows hereinbelow that utilization of the washing apparatus of the invention is relatively simple and that the operation can be easily controlled while effecting an efficient cleaning of vehicles subjected to washing in this apparatus.

Figure 1:
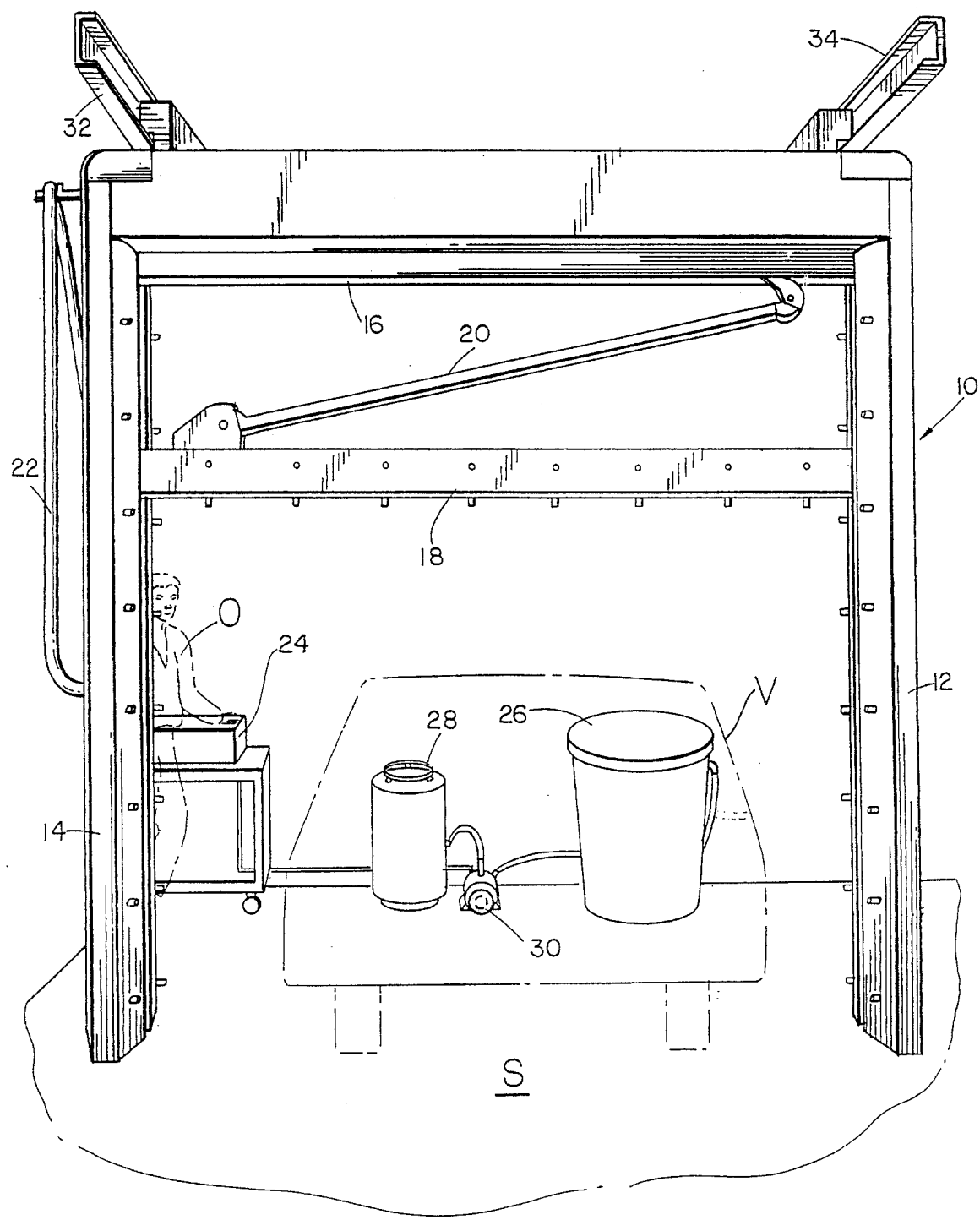
FIG. 1 is a perspective view of a vehicle washing apparatus provided in accordance with the invention, this figure being further illustrative of the method of the invention.

In the perspective view appearing in FIG. 1 will be seen an inverted U-shaped frame 10 including vertical beams 12 and 14 connected by a header beam 16 which forms an inverted U-shaped structure. The vertical beams have lower ends which are suspended above the supporting surface S upon which rests a vehicle V shown in phantom lines. It is the purpose of the U-shaped structure 10 to provide for directing jets of fluid against the sides of the vehicle V. To enable directing jets of fluids against the top surfaces of the vehicle there is employed a horizontal beam 18 supported at opposite ends in the respective vertical beams 12 and 14. The horizontal beams is capable of downward and upward movements relative thereto thereby to follow under manual or automatic control the profile of the vehicle and such as to provide an optimum spacing between the fluid sources and the vehicle itself.

To provide washing fluid to the horizontal beam 18 while accommodating the upward or downward displacement thereof, there is provided a structure including a series of connected links as will be shown in greater detail hereinbelow. Within these links there are accommodated hoses or internal passageways through which the fluid is transmitted into the horizontal beam 18. The fluid escape from the horizontal beam via nozzles provided therein as will also be explained in greater detail below.

Fluid is supplied to the vertical beams 12 and 14 as well as to the horizontal beam 18 by means of a hose or bundle of hoses 22. The force of fluid passing through the hoses can be controlled automatically by a programmed computer or control box 24 or by means of manual controls afforded in conjunction with the computer. This enables the control of the water source and the detergent source 26 and the pressure tank 28 in association with the operation of the pump 30, the speed of which is controlled either manually or by computer or box 24 as aforesaid.

The inverted U-shaped structure 10 and thereby the vertical beams 12 and 14 are installed to be displaced along the tracks 32 and 34. It will be noted that the U-shaped structure 10 defines generally a vertical plane. Movement of the U-shaped structure 10 in directions perpendicular to the aforesaid plane is provided by a motor which will be discussed in greater detail below.

As indicated above, the U-shaped structure 10 is supported in depending relationship from tracks 32 and 34 to enable the desired movement of the washing apparatus. The tracks 32 and 34 are preferably fabricated of a metal such as aluminum or steel and been arranged in horizontal and parallel relationship to constrain the desired movement of the washing apparatus. It will be noted that the vertical and horizontal beams can be in a major portion fabricated of a metal such aluminum or steel and that the beams are preferably provided with a covering of fiberglass or the like which intended is to protect the vehicle being washed as well as the metal of the beams. The fiberglass is further intended to protect the operator or user of the washing apparatus of the invention.

Figure 2A:
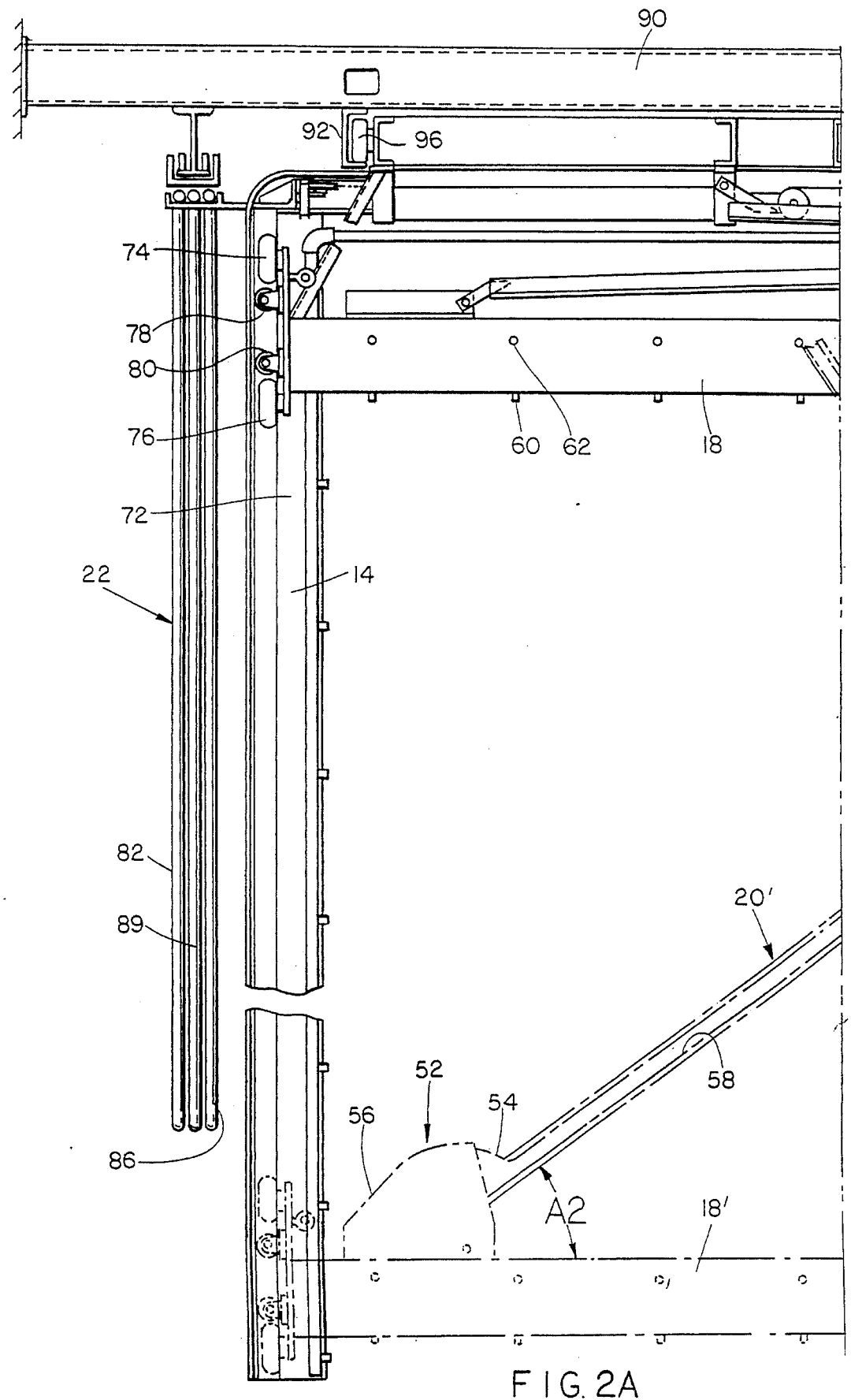
FIGS. 2A and 2B, joined along the center chain lines, collectively constitute a front view of the apparatus of FIG. 1 in which are eliminated some components and paneling for purposes of clarification, a component of the washing apparatus being shown in phantom lines to illustrate the extending thereof.
Figure 2B:
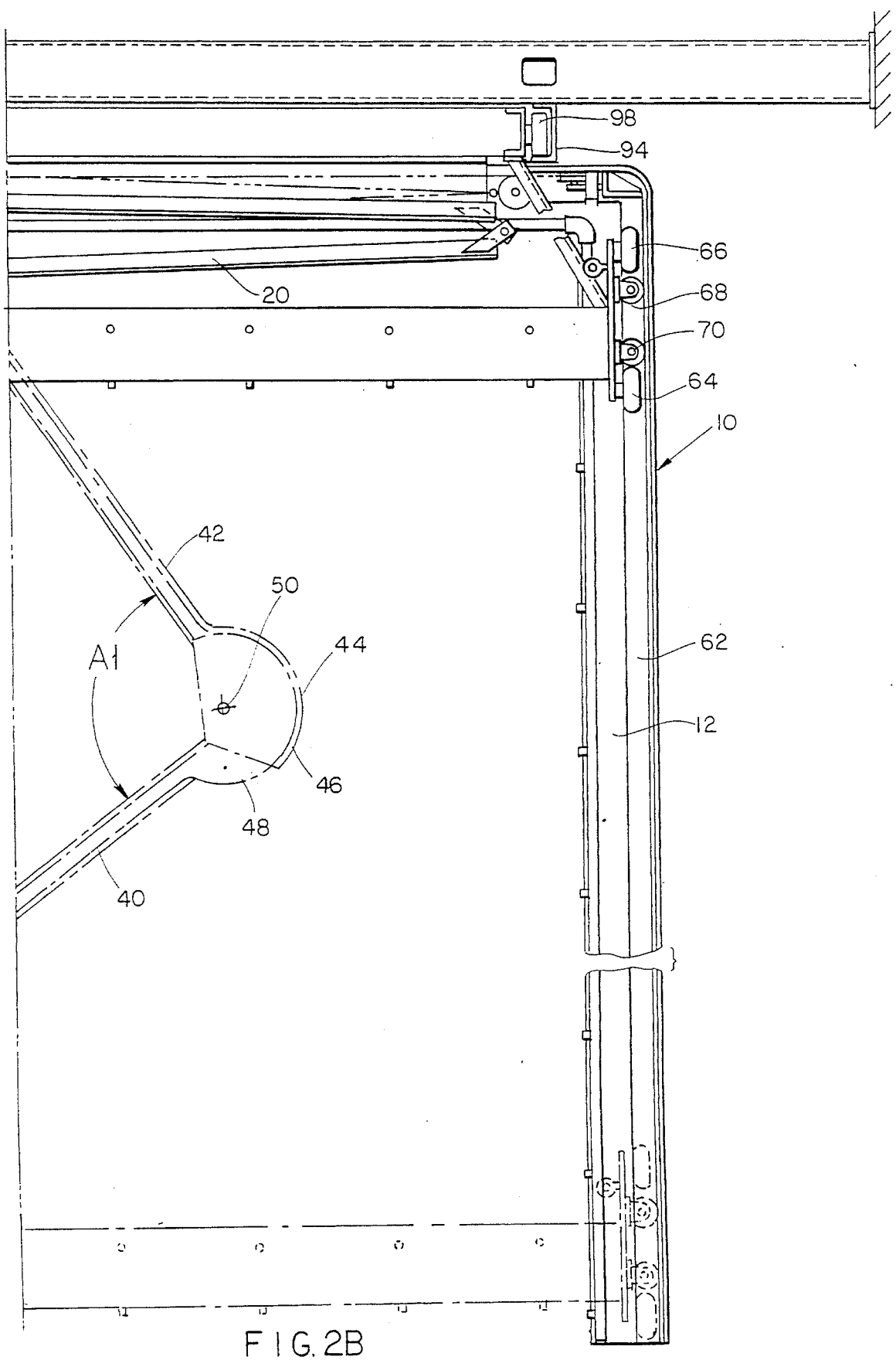

In FIG. 2 (which is a front view of the U-shaped structure 10 previously referred to with regard to FIG. 1) are again illustrated the vertical beams 12 and 14 and the horizontal beam 18. A displaced positioning of the horizontal beam is indicated at 18'. Also illustrated is the link series 20, a displaced position for the link arrangement, being indicated at 20'. Therein it will be seen that the links of this arrangement, such as indicated at 40 and 42, are connected by a pivot arrangement 44 consisting of 2 part-circular sections 46 and 48. Sections 46 and 48 are in nesting relationship thereby permitting a pivotal movement about pivot center 50 so that the angle A1 between links 40 and 42 can be varied. To accommodate this variation, provision is made at 52 for a similar part-circular arrangement of components 54 and 56 so that the angle A2 between the horizontal beam and link 40 can be accommodated. Internally of the links is provided a passageway or hoses or bundle of hoses such as indicated at 58. This arrangement provides for the supply of washing fluid to the horizontal beam 18 and for projection from the latter by means of a plurality of nozzles such as indicated at 60. One of these series of nozzles is provided along the bottom of the horizontal beam 18 whereas another series is indicated by way of example at 62 for purposes of projecting washing fluid horizontally from the beam 18 as has been mentioned hereinabove. There is also another series of nozzles on the opposite side of horizontal beam 18 to enable washing fluid to be projected in a horizontal direction opposite to that effected by nozzles 62. This enables the projection of fluid in opposite directions according to whether the horizontal beam 18 is displaced to the front of the vehicle to the back thereof.

In association with the vertical beam 18 is provided a track 62 wherein are accommodated rollers 64, 66, 68 and 70 associated with one end of the horizontal beam 18. Track 62 provides for the guidance of the related end of the horizontal 18 by reason of which the rollers ride in and are guided by this track. At the opposite end of the horizontal beam is provided a track 72 wherein ride rollers 74, 76, 78 and 80. These rollers are also accommodated in and guided by the track 72 to guide the associated end of the horizontal beam in its movement down and up the vertical beam 14.

Also illustrated in FIG. 2 is the hose or supply 22 in the form of loops 82, 84 and 86 which will be described in greater detail hereinbelow. It is sufficient at this point to note that the provision of loops 82, 84 and 86 is intended to accommodate the movement of the frame 10 perpendicular to the plane defined thereby, while nevertheless affording a supply of washing fluid to the vertical beams 12 and 14 and to the horizontal beam 18.

Above the U-shaped structure 10 is a fixed beam or support 90 from which depend tracks 92 and 94 accommodating therein rollers 96 and 98. Beams 92 and 94 constitute parts of the tracks 32 and 34 of FIG. 1 and provide by reason of the rollers 96 and 98 for the guided movement of the vertical beams 12 and 14.

Figure 3:
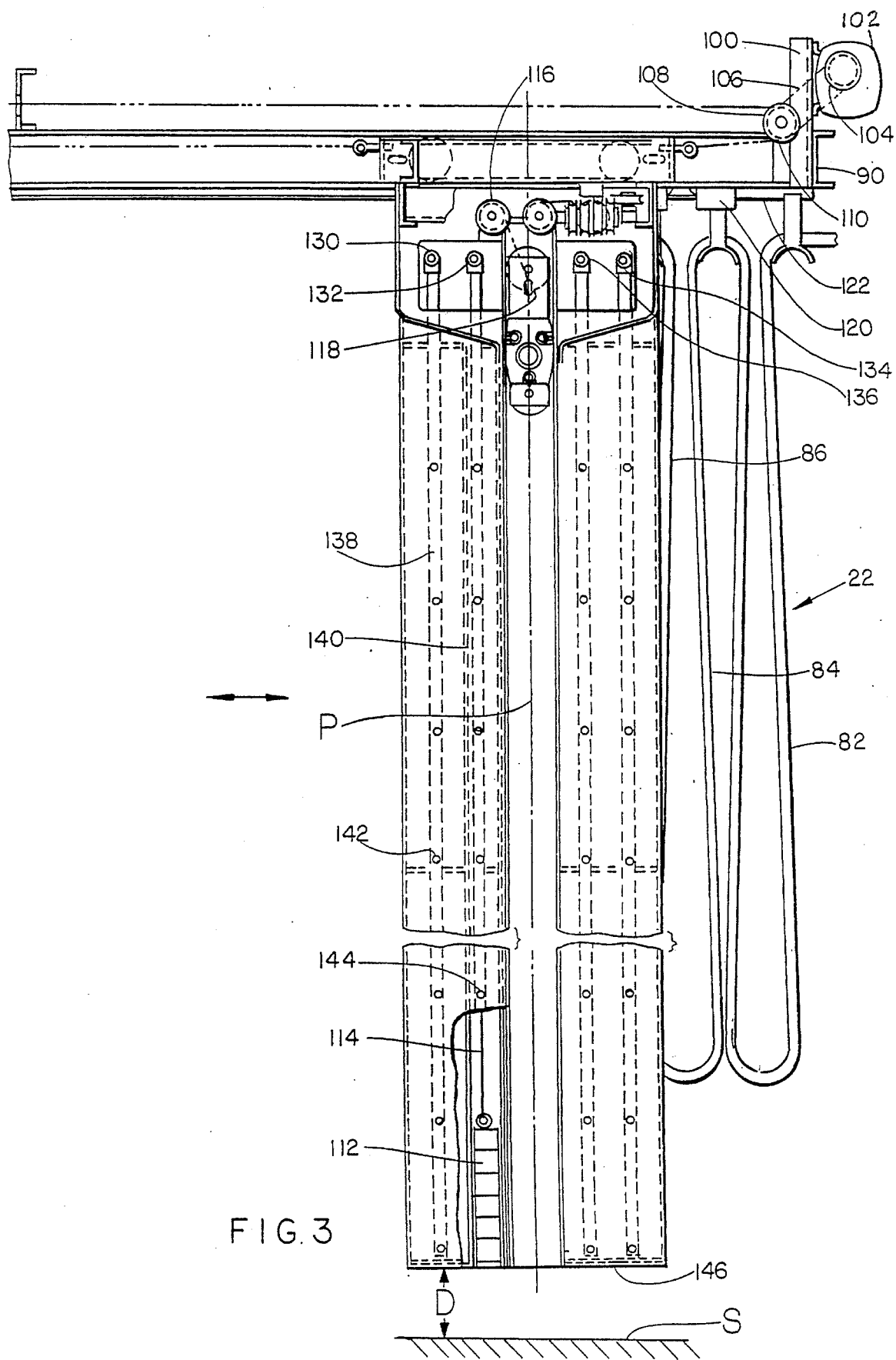
FIG. 3 is side view of part of the apparatus of FIG. 1, with a portion of the apparatus eliminated showing the extent of the vertical beams and hoses supplying fluid to the same.

FIG. 3 illustrates that the beam 90 includes a support 100 on which is mounted a motor 102. The motor 102 drives a sprocket 104 which through a chain connection 106 drives a sprocket 108. Sprocket 108 drives a cog 110 which enables the driving of the vertical beams 12 and 14 along a track to permit of displacement of vertical beams 12 and 14 as aforesaid.

Further illustrated in FIG. 3 are a series of counterbalancing weights 112 connected by cable 114 via a pulley 116 to the horizontal beam as indicated at 118. Counterbalancing weights 112 counter-balance the weight of the horizontal beam 18 so as to permit a ready displacement of the same by means of a controlling mechanism as will be discussed in greater detail hereinbelow.

Further illustrated in FIG. 3 are the supply hose or line 22 consisting of the various loops 82, 84 and 86 as mentioned hereinabove. As will be seen, these loops 82, 84 and 86 are in the form of U-shaped or hairpin loops the upper ends of which are supported in slides 120 and 122 by way of example. The slack provided by these loops enables the vertical beams to be displaced without any interference or curtailing of their motion by means of the lines or hoses which are supplying the washing fluid with detergent therein.

Connection to the vertical beams for the provision of washing fluid thereto is indicated in the form of connections 130, 132, 134 and 136 which are, by way of example, connections with the internal hoses or passageways indicated at 138 and 140 in the vertical beams. Also, indicated are the nozzles 142 and 144 which are intended to permit jets of washing fluid to be projected from one vertical beam toward the other so that the fluid is projected against the sides of vehicle being washed.

Also to be noted in FIG. 3 is that the lower ends 146 of the vertical beams are spaced at a distance D above the surface S upon which the vehicle being washed is supported. This means that the vertical beams are suspended in hanging relationship relative to the horizontal tracks along which they are displaced. The plane which has been referred to previously relative to the U-shaped frame 10 as seen by way of example at P. This is a plane vertical to the surface S the plane also lies perpendicular to the surface of the drawing.

With respect to FIG. 4, it can be seen that while reference has been made hereinabove to a cog moving along a toothed track for the displacement of the vertical beams, there is also another motive form indicated by way of a chain 150 connected at opposite ends to brackets 152 and 154, these being connected to the arch 10. This cable 150 rides across a sprocket 156 driven by the aforementioned motor 102 which thereby provides for the desired displacement of the vertical beam and U-shaped frame in a manner previously indicated hereinabove.

Figure 4:
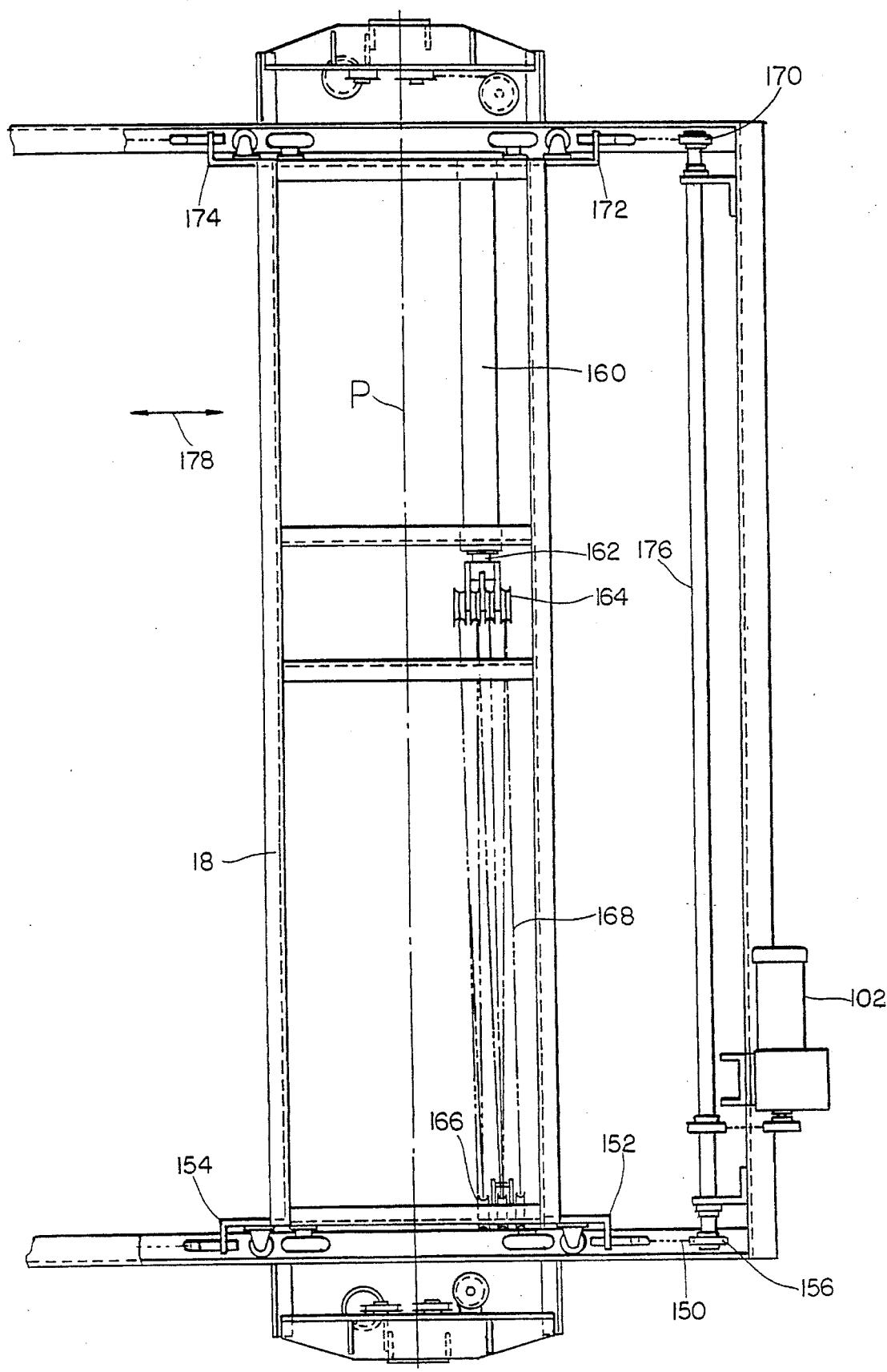
FIG. 4 is a top view of part of the apparatus of FIG. 1 with certain paneling being eliminated to expose the components enabling displacement of the horizontal beam included in the structure illustrated in FIGS. 1–3.

Referring next to the vertical displacement of the beam 18, there will be seen in FIG. 4 for this purpose a cylinder 160 and a piston 162 forming a piston-and-cylinder arrangement for the displacing a brace of pulleys 164. These pulleys operate with a second brace of pulleys 166 to provide for the lengthening and shortening of the cables 168 connected to the horizontal beam 18 and thereby providing for the raising and lowering of this beam consistent with the displacement of the piston 162 within the cylinder 160.

Also seen in FIG. 4 operating in conjunction with sprocket 156, is a pulley or sprocket 170 connected by a cable to a flange 172 at one end and at the other end to a flange 174 thereby providing (through the use of rod 176) for equal displacement of the vertical beams relative to one another in a direction perpendicular to the horizontal plane P as indicated by the double headed arrow 178.

Referring again to FIG. 1, it is seen that the inverted U-shaped structure 10 is displaceable longitudinally along the vehicle V with washing fluid consisting of water from the tank 26 and pressure from the tank 28 being conveyed to the U-shaped frame 10 by hose 22 to supply both the vertical beam and the horizontal beams and to be projected inwardly against the sides of the vehicle V. The U-shaped frame 10 is displaced in one direction or another according to double headed arrow 178 (FIG. 4) under the control of the computer or box 24 by the operator O. This control may be either manual or may be programmed into the computer according to well known techniques.

As the U-shaped frame is displaced along the vehicle, the horizontal beam 18 can be varied in its vertical position according to the profile of the vehicle to be suspended say, for example, 6 to 18 inches above the hood of the vehicle or the same distance above the roof of the vehicle or likewise the same distance above the trunk section of the vehicle.

Preferably the vehicle is stationary according to the technique which has been described above with the washing apparatus being displaced relative to the vehicle. It will be noted, however, that the framework can be made stationary according to another embodiment of the invention with the vehicle being moved relative thereto. In such instance, displacement of the vertical beams is no longer necessary. However, vertical displacement of the horizontal beam 18 would still be employed for purposes of following the profile of the vehicle.

It will be noted that the nozzles on the horizontal beam of the invention can be provided by a single passageway with washing fluid or that the respective series of nozzles can be provided with individual and respective sources of washing fluid through individual and respective hoses. In such event, the control box or computer 24 is used to control which series of nozzles is operative to discharge fluid as the washing operation takes place; i.e., the projection is downward, to the rear or to the front.

The method of washing a vehicle according to a preferred embodiment of the invention thus comprises positioning the vehicle between space vertical beams adapted to straddle the vehicle and displacing the vertical beams along the vehicle while projecting washing fluid out of the vertical beams towards the vehicle. The method further comprises supporting a horizontal beam between the vertical beams and displacing the same on the vertical beams according to the profile of the vehicle and projecting washing fluid out of the horizontal beam at the vehicle.

While reference has been made hereinabove to spaced vertical beams, it is clear that the vertical beams can take on various configurations as desired for purposes of appearance or otherwise without departing from the scope of the invention. Thus, for example the vertical beams illustrated may be substituted for by curved or arcuate beams or beams consisting of a jagged saw tooth profile or the like. Similarly, while the horizontal beam has been illustrated as being rectilinear in configuration, different geometrical shapes are clearly possible within the scope of the invention.

There will now be obvious to those skilled in the art many modifications and variations of the structures and methods set forth hereinabove. These modifications and variations will not depart from the scope of the invention if defined by the following claims.

What is claimed is:

1. Vehicle washing apparatus comprising two at least generally vertical beams, an at least generally horizontally beam extending between the vertical beams, said beams having internal passages for the flow of fluid therethrough, spray means in said vertical beams and connected with said passages whereby fluid can be sprayed from each vertical beam towards the other vertical beam, spray means in the horizontal beam and connected with the passages therein whereby fluid can be sprayed in opposite horizontal directions and generally downwards, control means to raise and lower the horizontal beam between the vertical beams, and supply means to supply fluid to the internal passages of said beams, said supply means including pivotally connected links extending to said horizontal beam and a tube extending through said links and connected to the passageway in the horizontal beam to deliver fluid to the same.

2. Vehicle washing apparatus as claimed in claim 1, comprising counterbalancing means connected to the horizontal beam to counterbalance the weight thereof.

3. Vehicle washing apparatus as claimed in claim 1, wherein the links include respective part circular units in nesting relationship to join the links pivotally together and to said horizontal beam.

4. Vehicle washing apparatus as claimed in claim 1, wherein the supply means includes serially connected U-shaped sections of hose connected to the passageways in the vertical beams and adapted to play out to accommodate displacement of the vertical beams.

5. Vehicle washing apparatus comprising two at least generally vertical beams, an at least generally horizontally beam extending between the vertical beams, said beams having internal passages for the flow of fluid therethrough, spray means in said vertical beams and connected with said passages whereby fluid can be sprayed from each vertical beam towards the other vertical beam, spray means in the horizontal beam and connected with the passages therein whereby fluid can be sprayed in opposite horizontal directions and generally downwards, control means to raise and lower the horizontal beam between the vertical beams, said horizontal beam including top and bottom sections and opposite side sections between the top and bottom sections and said spray means including nozzles on said opposite side and bottom sections.

* * * * *